Nov. 12, 1963 H. D. POST 3,110,210

TAPE SPLICER WITH TURNABLE CUTTER

Filed Aug. 25, 1958 5 Sheets-Sheet 1

INVENTOR.
Herman D. Post
BY
Michael S. Striker
Attorney

Nov. 12, 1963 H. D. POST 3,110,210

TAPE SPLICER WITH TURNABLE CUTTER

Filed Aug. 25, 1958 5 Sheets-Sheet 2

INVENTOR.
Herman D. Post
BY
Michael S. Striker
Attorney

Nov. 12, 1963 H. D. POST 3,110,210

TAPE SPLICER WITH TURNABLE CUTTER

Filed Aug. 25, 1958 5 Sheets-Sheet 3

INVENTOR.
Herman D. Post
BY
Michael S. Striker
Attorney

Nov. 12, 1963 H. D. POST 3,110,210

TAPE SPLICER WITH TURNABLE CUTTER

Filed Aug. 25, 1958 5 Sheets-Sheet 4

INVENTOR.

Herman D. Post

BY

Michael S. Striker

Attorney

Nov. 12, 1963 H. D. POST 3,110,210

TAPE SPLICER WITH TURNABLE CUTTER

Filed Aug. 25, 1958 5 Sheets-Sheet 5

INVENTOR.
Herman D. Post
BY
Michael S. Striker
Attorney 3,110,210
TAPE SPLICER WITH TURNABLE CUTTER
Herman D. Post, 36—27 Prince St., Flushing, N.Y.
Filed Aug. 25, 1958, Ser. No. 758,647
4 Claims. (Cl. 83—550)

The present invention relates to splicing devices for splicing recording tape or the like.

When a length of a recording tape or the like breaks, it is necessary to splice the ends of the tape at the break together, and the present invention relates to structures for making splices of this type.

A device for splicing tape which is of the same general type as the devices of the present invention is shown in U.S. Patent 2,778,420, and the instant invention provides improvements over the structure shown in this patent.

One of the objects of the present invention is to provide a device for splicing tape or the like which includes a plurality of different cutting members capable of being quickly and easily moved to cutting positions while at the same time requiring a minimum amount of space for such movement so that the device of the present invention is extremely compact.

Another object of the present invention is to provide a device of the above type which at all times lets the operator know which of a plurality of cutters is in a cutting position.

A further object of the present invention is to provide a device of the above type which is very easy to operate reliably and which at the same time guarantees that the operator will not become injured by the cutters.

It is also an object of the present invention to provide a device of the above type which is capable of automatically locating the several cutters sequentially in a cutting position so that the operator need not be concerned with the location of the proper cutter in the operating position.

It is also an object of the present invention to provide an exceedingly simple and reliable structure for accomplishing all of the above objects.

With the above objects in view the present invention includes in a device for splicing tape or the like a cutter carrying body which carries a plurality of cutters distributed about and spaced equidistantly from an axis which passes through the cutter carrying body. In accordance with the present invention this cutter carrying body is carried by a guide arm means which guides the body for movement to and from a cutting position and which also supports the body for rotary movement about the above axis to locate a selected one of the cutters in an operating position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Referring now to FIGS. 1–6, the embodiment of the invention illustrated therein includes a support means formed by a base plate 25 and an upper plate 26 fixed to the plate 25 as by being screwed to the top face thereof. The upper plate 26 has a rear extension 27 extending upwardly away from the base plate 25, and this extension 27 is bifurcated for a purpose described below.

Figure 6:
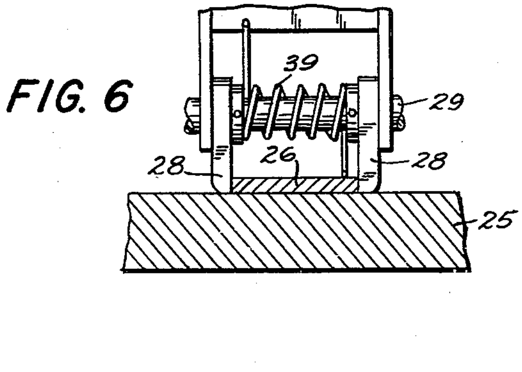
FIG. 6 is a fragmentary sectional elevational view taken along VI—VI of FIG. 1 in the direction of the arrows.

The plate 26 is provided just in front of the rear extension 27 thereof with a pair of upwardly directed ears 28 which are respectively formed with a pair of aligned bores through which a shaft 29 passes, this shaft 29 being prevented from shifting axially by any suitable collars fixed to the shaft 29 and engaging the ears 28 at their inner faces, as indicated in FIG. 6, for example.

The plate 26 fixedly carries an elongated channel member 30 which extends across the plate 26 and which is adapted to receive the tape ends which are to be spliced together. In this connection attention is directed to U.S. Patent 2,778,420 which shows a similar channel member for receiving the tape ends which are to be spliced.

The ends of the tape which are to be spliced together are releasably held on the channel member 30 by a pair of arms 31 which are pivotally carried by the shaft 29 outwardly of the ears 28 and which are prevented from shifting axially on the shaft 29 by any suitable collars, or the like. These tape holding arms 31 are provided with manually engageable ends 32 which are accessible to the operator for turning the arms 31 between the solid and dot-dash line positions indicated in FIG. 3. The plate 26 fixedly carries a pair of leaf springs 33 which cooperate with the rear ends of the arms 31. Thus, when the arms 31 are in the solid line position indicated in FIG. 3, the lower rear corner 34 of these arms are pressed upon by the springs 33 so that the latter urge the arms 31 to turn in a clockwise direction, as viewed in FIG. 3. On the other hand, when the arms 31 are in their upper inoperative positions shown in dot-dash lines in FIG. 3, the rear edges 35 of the arms are engaged by the leaf springs 33 which now maintain the arms in their upper inoperative positions. The arms carry at their under sides pads of foam rubber 36, respectively, which directly engage the tapes when the arms are in their lower operating positions, and when the device is used the operator first places the tape ends which are to be spliced together in the channel 30 with these ends overlapping each other, and then the arms 31 are turned down to their operating position so that the arms 31 serve to hold the tape ends while they are being spliced, in a manner similar to that shown in the above U.S. Patent 2,778,420.

The structure of the invention includes a guide arm 37 which together with the pivot shaft 29 forms a guide arm means for the purpose described below. This guide arm 37 is pivotally carried by the shaft 29 and the arm 37 has at its rear end a downwardly directed hollow portion 38 (FIG. 1) which receives the ears 28 in the manner shown most clearly in FIG. 6, and the shaft 29 extends through aligned openings of the arms 37 which are respectively aligned with the openings of the ears 28. Thus, the arm 37 is supported by the shaft 29 for turning movement between the solid and dot-dash line positions indicated in FIG. 1. A spring 39 is coiled about the shaft 29 between the ears 28, has one end engaging the plate 26, and has its opposite end engaging the arm 37 in the hollow portion 38 thereof so as to urge the arm 37 upwardly to its solid line rest position indicated in FIG. 1. It will be noted from FIG. 1 that the rear portions of the ears 28 are stepped so as to have rearwardly extending projections 40 which cooperate with the rear edge of the arm 37 to serve as a stop therefore, so that the spring 39 only can turn the arms 37 to the solid line position indicated in FIG. 1.

Adjacent its free end distant from the shaft 29 the arm 37 is formed with a bore 41 which enables the arm 37 to serve as a support for a rotary cutter carrying body 42, this cutter carrying body 42 being made of any suitable metal and being fixed to the bottom end of a shaft 43 which extends through the bore 41 so as to be supported by the arm 37 for rotation. A pair of collars 44 are fixed to the shaft 43 at the opposite faces of the arm 37, respectively, so as to prevent axial shifting movement of the shaft 43, and thus the cutter carrying body 42 is constrained to turn with the arm 37 between its lower dot-dash line position indicated in FIG. 1 and its upper solid line position indicated in FIG. 1.

Figures 1, 2, 3, 4, 5:
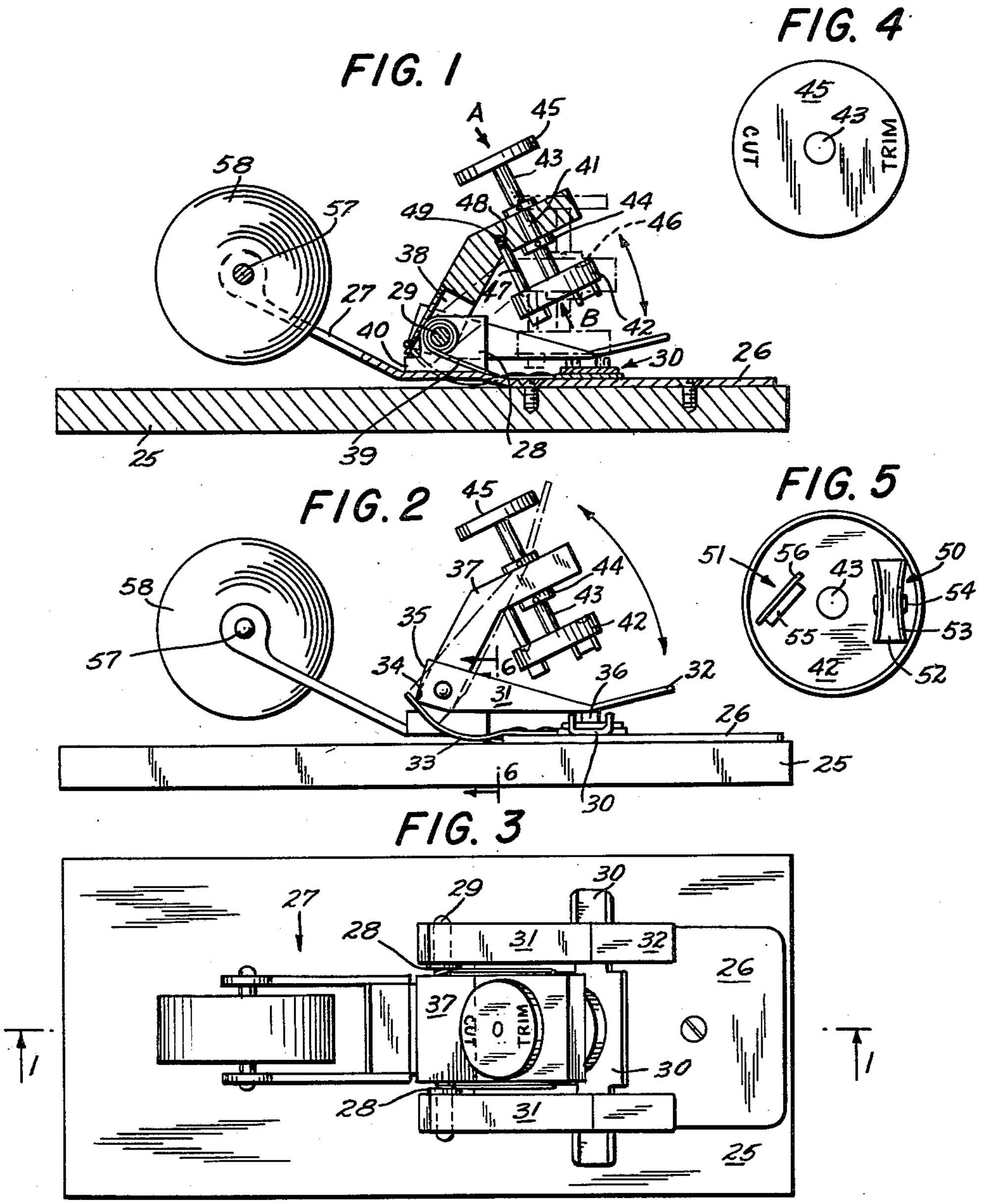
FIG. 1 is a longitudinal sectional elevational view of a tape splicing device according to the present invention, the section of FIG. 1 being taken along I—I of FIG. 3 in the direction of the arrows.
FIG. 2 is a side elevational view of the device of FIG. 1.
FIG. 3 is a top plan view of the structure of FIGS. 1 and 2.
FIG. 4 is a view of an operating knob of the device of FIG. 1 as seen in the direction of A of FIG. 1.
FIG. 5 illustrates a cutter-carrying body of the embodiment of FIG. 1 as seen in the direction of arrow B of FIG. 1.

A knob in the form of a disc 45 is fixed to the top end of the shaft 43, and as is indicated in FIG.4 the upper face of this disc 45 may be provided with suitable indicia for purposes described below.

The upper face of the cutter carrying body 42 is formed with a pair of diametrically opposed recesses 46, and a spring pressed pin 47 cooperates with these recesses to serve as a detent for holding the body 42 in one of a pair of angular positions which are displaced from each other by 180°. The pin 47 extends slidably into a bore 48 of the arm 37, and a spring 49 in this bore acts on the pin 47 in the manner shown in FIG. 1.

Referring now to FIG. 5, it will be seen that the cutter carrying body 42 fixedly carries at its underside a trimming cutter 50 and a diagonal cutter 51, these cutters being similar to those of U.S. Patent 2,778,420. Thus, the body 42 has at its underside a projection 52 against the opposite concave faces of which a pair of trimming cutter blades 53 are fixed as by a rivet 54 passing through the projection 52 and the cutters 53, and a diagonal cutter 51 includes a similar projection 55 of the body 42 to which the single diagonal cutter blade 56 is fixed as by a rivet or the like.

As may be seen from FIGS. 4 and 5, when the disc 45 is turned by the operator to a position locating the designation "Trim" toward the front facing the operator, then the trimming cutter 50 is in an operating position, while when the disc 45 has been turned through 180° so as to locate the designation "Cut" toward the front, the diagonal cutter 51 is in the operating position.

The parts are so designed that when the diagonal cutter 51 is in its operating position and the operator presses downwardly on the disc 45, the arm 37 will turn against the action of the spring 39 in a clockwise direction, as viewed in FIG. 1, from the solid to the dot-dash position so that the cutter 51 will become located in the channel member 32 to cut across the overlapping tapes located therein. Then the operator releases the arm 37 so that the spring 39 returns it to its upper solid line position shown in FIG. 1, and the operator also at this time turns the disc 45 so as to locate the trimming cutter 50 in the operating position. The operator knows when the operating position is reached not only by the designation shown in FIG. 4 but also by feeling the detent pin 47 snap into one of the recesses 46.

The bifurcated rear extension 27 of the plate 26 carries a shaft 57 on which a roll of adhesive tape 58 is turnably mounted, and this tape may have its leading end extend between the ears 28 below the spring 39 toward and across the channel 30, so that after the overlapping ends of the tape have been cut by the diagonal cutter 51, the operator may press a portion of the adhesive tape 58 downwardly on to the tapes at the place where they have been cut, and thereafter the operator again turns the arm 37 downwardly so that the trimming cutters now cut the tape in order to complete the splice. This operation is clearly set forth in U.S. Patent 2,778,420 which shows a different device for splicing a tape by first cutting diagonally across the pair of overlapping tape ends, then, after removing the cut-away portion of the upper tape, pressing an adhesive tape against the two tape ends, and finally trimming the tape with trimming cutters. The embodiment of FIGS. 1–6 requires only that the disc 45 be turned so as to turn the cutter carrying body 42 in order to place one or the other blades in operating position.

After the tape has been spliced in the above-described manner, it is removed, and the apparatus is ready to be used again, the operator of course turning the knob 45 so as to again locate the diagonal cutter 51 in its operating position before proceeding with the next splice.

Figures 7, 8:
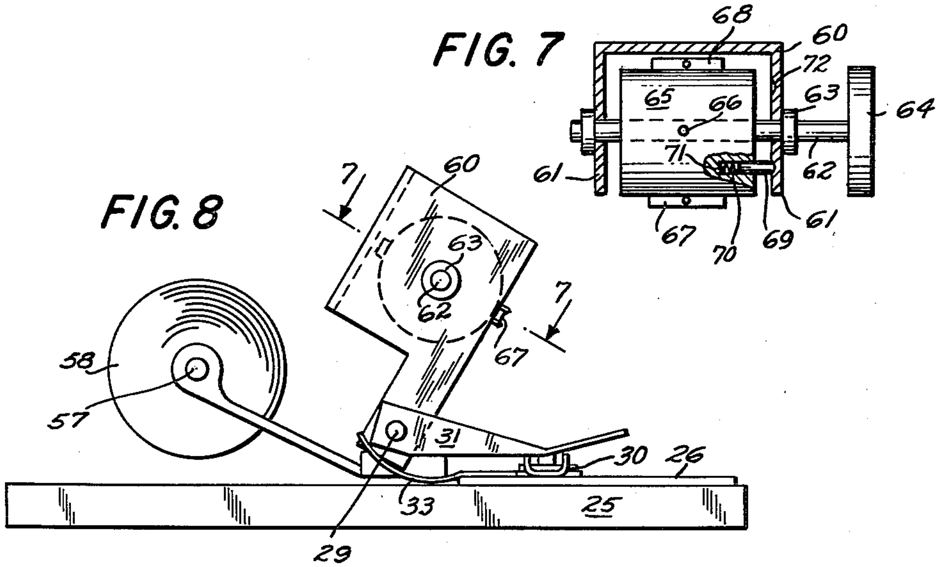
FIG. 7 is a sectional view of a part of another embodiment of a tape splicer according to the present invention, the section of FIG. 7 being taken along lines VII—VII of FIG. 8 in the direction of the arrows.
FIG. 8 is a side elevational view of the embodiment of the invention which includes the structure shown in FIG. 7.

The embodiment of the invention which is illustrated in FIGS. 7 and 8 is identical with that of FIGS. 1–6 except that the arm 37 is replaced by an arm 60 of an entirely different construction and the cutter carrying body also is differently constructed. Thus, referring to FIGS. 7 and 8, it will be seen that the arm 60 of this embodiment is in the form of a channel member which is open toward the bottom and which has a pair of side walls 61 which are pivotally carried by the shaft 29 in the same way that the arm 37 is carried by the shaft. The side walls 61 are formed with a pair of aligned bores through which a shaft 62 passes, and this shaft 62 fixedly carries a pair of collars 63 which prevent axial movement of the shaft 62 while permitting rotation thereof, a knob 64 which may be identical with the knob 45 being fixed to the right end of the shaft 62, as viewed in FIG. 7.

The cutter carrying body 65 of the embodiment of FIGS. 7 and 8 is in the form of a cylinder formed with an axial bore through which the shaft 62 passes and fixed to the shaft 62 by set screw 66, or the like, this body 65 being located within the channel 60 between its side walls 61. The cutter carrying body 65 carries the trimming cutters 67 and the diagonal cutter 68 in a position diametrically opposed to the cutters 67, these cutters 67 and 68 extending generally parallel to the axis of the body 65. Of course, the diagonal cutter 68 is inclined so as to produce the desired diagonal cut, while the cutters 67 have with respect to each other the hour-glass configuration shown for the cutter 50 in FIG. 5.

As may be seen from FIG. 7, a pin 69 extends parallel to the axis of cutter carrying body 65 and is slidable in bore 70 of the body 65, a spring 71 in this bore urges the pin 69 out toward the right, as viewed in FIG. 7, and the right wall 61 of FIG. 7 is provided with a pair of diametrically opposed recesses 72 into which the pin 69 is adapted to extend when the body 65 is turned between its different angular positions by the turning of the knob 64. Thus, in the position of the parts shown in FIG. 7, the pin 69 is in the lower recess 72 and the trimming cutter 67 is in the operative position, while when the knob 64 is turned in either direction through 180° so as to locate the pin 69 in the upper recess 72, the diagonal cutter 68 will be in the operative position, and of course the knob 64 has suitable designations as indicated in FIG. 4 which indicate to the operator which of the cutters is in the operating position.

The embodiment of FIGS. 7 and 8 is operated simply by pressing downwardly on the arm 60. Thus, the operator need only engage the top surface of the arm 60 to press the same down in order to cut the tape with either one of the cutters depending upon which of the cutters is in the operating position.

Except for the above-described differences, the embodiment of FIGS. 7 and 8 is identical with that of FIGS. 1–6. It will be noted that while in the embodiment of FIGS. 1–6 the axis of turning of the cutter carrying body 42 is perpendicular to the turning axis of the arm 37 and does not intersect this axis, in the embodiment of the invention shown in FIGS. 7 and 8 and the turning axis of the cutter carrying body 65 is parallel to the turning axis of the arm 60.

Figure 9:
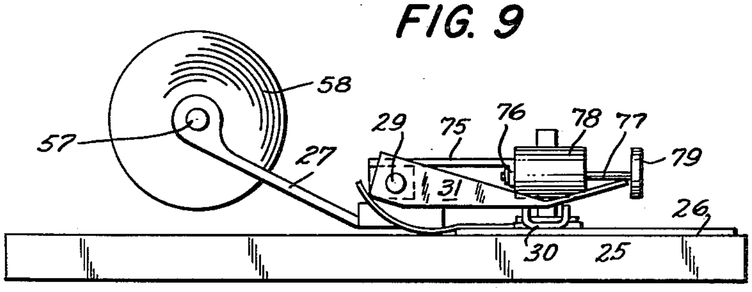
FIG. 9 is a diagrammatic side elevational view of another embodiment of a splicer according to the present invention.

The embodiment of the invention as illustrated in FIG. 9 includes a guide arm 75 which is pivotally carried by the shaft 29, this shaft being supported in the manner described above in connection with FIGS 1–6. The guide arm 75 has, for example, downwardly directed ears at its rear end formed with aligned openings through which the pivot shaft 29 extends. At its front end the guide arm 75 is provided with a downwardly directed ear 76 to which the shaft 77 is pivotally connected for rotary movement about its axis, this shaft 77 being turnably carried at its left end, as viewed in FIG. 9, by the ear 76. Any suitable collars or the like may be mounted on the shaft 77 to prevent axial movement thereof while permitting rotation thereof, and at its outer end the shaft 77 carries a knob 79 which may be identical with the knob 64 or 45 described above. The shaft 77 extends through an axial bore of a cylindrical cutter carrying body 78 which is fixed to shaft 77 as by a set screw similar to the set screw 66 of FIG. 7, and this cutter carrying body 78 carries a pair of opposed cutters for trimming the spliced tape and for cutting diagonally across tapes before they are spliced, as described above. Of course, in the embodiment of FIG. 9 the cutters extend transversely of the axis of the cylindrical body 78, while in the embodiment of FIG. 7 the cutters extend in a direction which is generally parallel to this axis of the carrying body. Thus, with the embodiment of FIG. 9, the operator need only turn the knob 79 so as to locate one or the other of the cutters in an operating position where it is directed downwardly, and then the guide arm 75 is turned down, as for example, by pressing down on handle 79.

Except for the above-noted differences, the embodiment of FIG. 9 is the same as that of FIGS. 1–6 and 7, 8. It will be noted that with the embodiment of FIG. 9 the axis of the cutter carrying body extends longitudinally of the guide arm 75, while with the embodiment of FIGS. 7 and 8 the axis of the cutter carrying body extends transversely of the guide arm 60. Of course, in the embodiment of FIGS. 1–6 the axis of the body 42 also extends transversely of the guide arm, but in this embodiment the axis of the body 42 is perpendicular to the axis of shaft 29 while in the embodiment of FIGS. 7 and 8 the axis of the body 65 is parallel to the shaft 29.

In the embodiment of FIG. 9 the downwardly directed ear 76 of the guide arms 75 has a width which is equal to the diameter of the body 78, and this body carries a spring pressed detent which cooperates with a pair of recesses in the ear 76 arranged at diametrically opposed sides of the shaft 77, so that with this embodiment also there is a spring pressed detent arrangement which lets the operator know when one or the other of the cutters is in its operating position.

Figure 10:
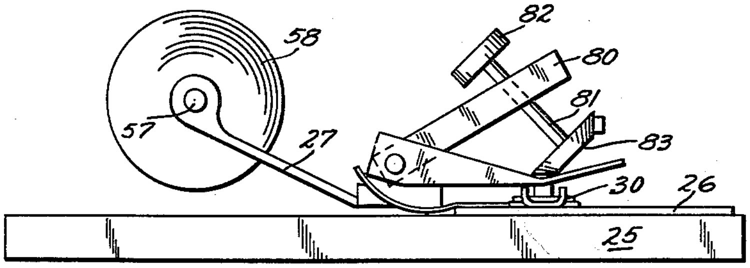
FIG. 10 is a side elevational view of a still further embodiment of a splicer according to the present invention.

In the embodiment of the invention which is illustrated in FIG. 10, the device includes a guide arm 80 which may be identical with the guide arm 37 except that the guide arm 80 is straight, as indicated in FIG. 10. A shaft 81 extends turnably through a bore of the arm 80, and it will be noted that this shaft 81 is inclined at an acute angle with respect to the longitudinal axis of the arm 80. Any suitable collars or the like are provided to restrain the shaft 81 against axial shifting movement, and the shaft 81 fixedly carries at its top end a knob in the form of a disc 82 which may be identical with any of the above discs. At its bottom end the shaft 81 fixedly carries cutter carrying body 83 which is in the form of a frustocone, and at diametrically opposed parts of its frustoconical side, the body 83 carries the cutters which correspond to the cutters 50 and 51 of FIG. 5. Except for these differences the embodiment of FIG. 10 is identical with that of FIGS. 1–6. The knob 82 is turned so as to locate one or the other of the cutters in the operating position, and then arm 80 is turned down in order to carry out the operation, the spring 39 acting on the arm 82 to return it to its rest position. Thus, while the embodiments of FIGS. 1–9 demonstrate the cutter carrying body may be located on any one of three mutually perpendicular axis, the embodiment of FIG. 10 shows that the turning axis of the body 83 may have any desired angle with respect to the guide arm.

In all of the above described embodiments of the invention, the rotary cutter carrying body is carried by a turnable guide arm. It is also possible, in accordance with the present invention, to mount the rotary cutter carrying body on a stationary guide arm, and such an embodiment illustrated in FIGS. 11 and 12. Thus, referring to FIGS. 11 and 12, it will be seen that the support plate 25 fixedly carries at its top surface a plate 26′ which is similar to the plate 26 except that it does not have a rearward extension 27 or the upstanding ears 28. This plate 26′ does however carry the same channel 30 for the tape which is to be spliced. Rearwardly of the plate 26′ the base plate 25 carries a pair of upwardly directed members 85 between which the roll of tape 58 is located, the roll of tape being supported on a shaft 86 which is carried by the members 85.

Figures 11, 12:
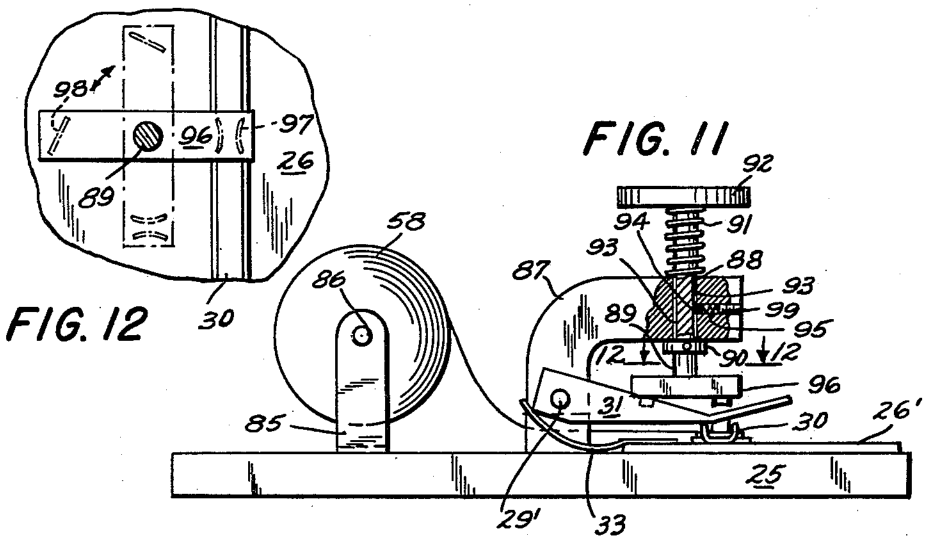
FIG. 11 is a partly sectional side elevational view of a still further embodiment of a splicer according to the present invention.
FIG. 12 is a fragmentary partly sectional plan view of part of the structure of FIG. 11, the section of FIG. 12 being taken along line XII—XII of FIG. 11 in the direction of the arrows.

A stationary guide arm 87 which is rigid and of substantially L-shaped configuration is fixed at one end to the top surface of the base plate 25, in the manner shown most clearly in FIG. 11. This guide arm 87 is formed with an elongated cutout 88 passing therethrough so that the tape 58 may extend through the opening 88 to a position over the channel 30.

The guide arm 87 is formed with a vertical bore 88 through which a shaft 89 extends so as to be freely turnable and axially shiftable in this bore, and the shaft 89 is limited in its upward movement by a collar 90 which is fixed to the shaft and engages the under side of the arm 87, as indicated in FIG. 11, in order to limit the upward movement of the shaft 89. The shaft 89 is urged upwardly by a spring 91 which is coiled about a portion of the shaft 89 which extends higher than the arm 87 at the bore 88 thereof, and this spring 91 engages the underside of a knob 92 which is fixed to the top end of the shaft 89, and this knob 92 may be identical with the knob 45, for example. Thus, the spring 91 always maintains the shaft 89 in an upper rest position. The shaft 89 is formed at diametrically opposed portions which are located in the bore 88 with a pair of axial grooves 93 one or the other of which receives the spring pressed ball member 94 which is acted upon by the spring 95 located in a suitable bore formed in the guide arm 87, as indicated in FIG. 11. This bore is threaded so as to receive a screw member 99 which may be turned so as to adjust the compression of the spring 95. Thus, when the shaft 98 is in one angular position the spring pressed ball 94 will be located in one of the grooves 93, and when it is in another angular position angularly displaced by 180° from the first angular position the spring pressed ball 94 will be in the other of the grooves 93.

A cutter carrying body 96 is fixed to the bottom end of the shaft 89, and this body 96 may simply take the form of a rectangular block of metal or the like, as is particularly apparent from FIG. 12. It will be noted that the channel 30 is displaced in a substantial distance forwardly of the axis of the shaft 89, as indicated in FIG. 12, and the result is that when the body 96 is in the dot-dash line position indicated in FIG. 12, this body is not located over the channel 30 so that the latter is freely accessible to the operator to enable the tape to be placed in or removed from the channel 30 without any difficulty. However, when the body 96 is located in the solid line position shown in FIG. 12, then one of the cutters 97 or 98 will be located over the channel 30, the cutter 97 being shown over the channel 30 in the position of the parts indicated in FIG. 12. The cutter 97 is the trimming cutter, while the cutter 98 is the diagonal cutter, and the grooves 93 are so located that the ball member 94 will be in one of these grooves when the parts have the position shown in solid lines in FIG. 12, while the ball 94 will be in the other of the grooves 93 when the diagonal cutter 98 is in position over the channel 30. With this arrangement, when the operator releases the knob 92 the spring 91 raises the body 96 to an elevation which locates the cutters higher than the channel 30, and this knob 92 is turned so as to locate the body 96 substantially in the dot-dash lines indicated in FIG. 12 so that free access may be had to the channel 30. When it is desired to cut the tape with one or the other of the cutters indicated in FIG. 12, then after one of these cutters has been placed in its operating position, the operator need only press the knob 92 against the force of the spring 91 in order to effect the desired cut, and then upon release of the knob 92 the spring 92 will return the parts to their rest position.

Except for the above-noted differences, the embodiment of FIG. 11 is the same as the other described embodiments in that it includes the same arms 31 mounted in the same way and acted upon by the same springs 33 to cooperate with the tape in the manner described above.

In all of the above described embodiments of the invention it is necessary for the operator to turn the cutter carrying body to one of a pair of angular positions in order to locate the desired cutter in the operating position. FIGS. 13–17 illustrate an embodiment of the invention where the turning of the cutter carrying body between its operating positions is carried out automatically. As may be seen from FIGS. 13–17, this embodiment of the invention also includes a base plate 25 carrying a pair of upwardly directed members 85 between which the roll of adhesive tape 58 is located on a shaft 86 which extends between and is carried by the members 85, in the manner described above in connection with FIG. 11. Also, a tape receiving channel 30 is provided, but this channel 30 is mounted directly on the base plate 25.

Figure 17:
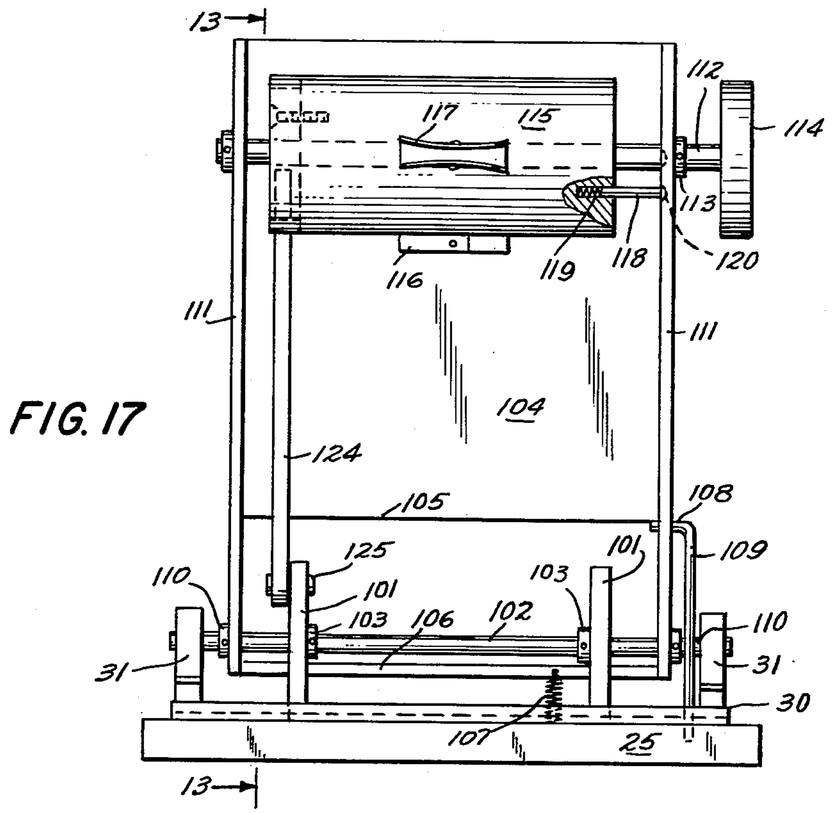
FIG. 17 is a transverse elevational view of the structure of FIG. 13 as seen from the right side of FIG. 13.

This base plate 25 fixedly carries at its top face a substantially U-shaped support member 100 having a pair of upwardly directed end walls 101 respectively formed with a pair of aligned bores through which the shaft 102 extends, this shaft 102 corresponding to the above-mentioned shaft 29. The shaft 102 fixedly carries a pair of collars 103, as indicated in FIG. 17, for preventing axial shifting of the shaft 102 while permitting free turning thereof.

The guide arm 104 of this embodiment is generally similar to the guide arm 60 of the embodiment of FIGS. 7 and 8 in that the guide arm 104 is also in the form of a channel. The top wall of the channel 104 terminates at a rear edge 105 which is short of the rear ends of the side walls 111 of the guide arm 104, so that during turning of the arm 104 between the solid and dot-dash line positions indicated in FIG. 13, the guide arm 104 will clear the parts 101 of the number 100. At its rear end the guide arm 104 is provided with a cross bar 106 extending across and fixed to the rear ends of the side walls 111, and this cross bar 106 has one end of a spring 107 fixed thereto, the opposite of this spring being fixed to the base plate, so that the spring 107 urges the guide arm 104 upwardly to the dot-dash line position indicated in FIG. 13 from the solid line position shown in FIG. 13. A stop member 108 limits the upward turning of the guide arm 104, and this member 108 forms the top end of a substantially L-shaped stop member 109 fixed at its bottom end to the base plate 25, as indicated in FIG. 17, and located to the right of the guide arm 104, as viewed in FIG. 17. The shaft 102 carries a pair of additional collars 110 which engage the outer surfaces of the side walls 111, respectively, so as to prevent shifting of the guide arm 104 along the shaft 102, and at its outer free ends the shaft 102 carries a pair of tape holding arms 31 identical with those described above and cooperating in the same way with unillustrated leaf springs.

The pair of walls 111 of the guide arm 104 are respectively formed with a pair of aligned bores through which a shaft 112 extends parallel to the pivot shaft 102, and the shaft 112 fixedly carries a pair of collars 113 which respectively engage walls 111 so as to prevent axial movement of the shaft 112 but permitting rotary movement thereof. The shaft 112 carries at its right end, as viewed in FIG. 17, a disc 114 provided with designations similar to those indicated in FIG. 4, so that the operator will know which of the cutters is in operating position, but with the embodiment of FIGS. 13–17 the operator does not use the disc 114 to turn one or the other of the cutters in to its operating position.

The shaft 112 extends through an axial bore of the cutter carrying body 115 which is fixed to the shaft 112 as by a set screw or the like, and this body 115 is located between the walls 111 of the arm 104. The cutter carrying body 115 carries a diagonal cutter 116 and trimming cutter 117 as indicated in FIG. 17, and it will be noted from FIG. 13, that these cutters are angularly displaced by 90° from each other. Thus, the designations "Cut" and "Trim" on the right face of the disc 114, as viewed in FIG. 17, are angularly spaced from each other by only 90° so as to be in an upward position indicating which of the cutters 116 or 117 is in its operative position.

A pin 118 is slidable in a bore of the body 115 and is urged outwardly by a spring 119 into engagement with one of a pair of recesses 120 formed on the right face of the right wall 111 of FIG. 17, these recesses 120 being angularly displaced about the shaft 112 by 90° and being located therefrom at the same radial distance as the pin 118, so that this pin is located in one or the other of the recesses 120 depending upon which of the cutters is in the operating position, as will be apparent from the description that follows.

Figure 16:
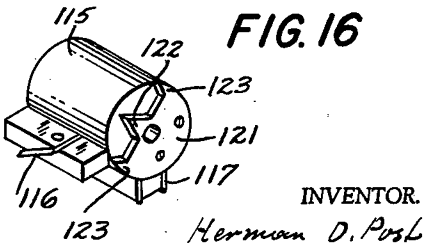
FIG. 16 is a perspective view of the cutter carrying body of FIGS. 13–15.

The cutter carrying body 115 fixedly carries at its left face, as viewed in FIG. 17, a cam 121 the configuration of which is shown most clearly in FIG. 16. This cam is fixed by suitable counter sunk screws to the end of the cutter carrying body 115, and the cam 121 is provided with a central tip portion 122 as well as with a pair of end portions 123 spaced laterally from and on opposite sides of the tip 122 to define recesses therewith for a purpose described below.

Figure 13:
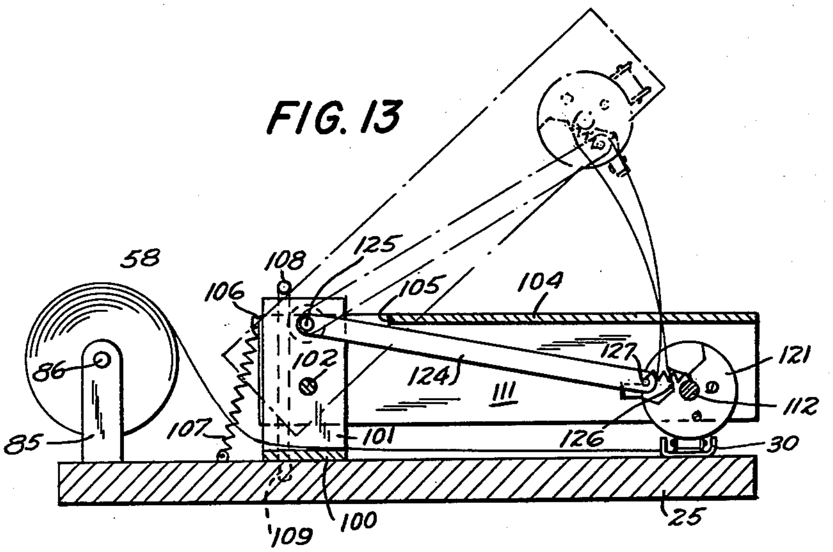
FIG. 13 is a longitudinal sectional elevational view of a further embodiment of a splicer according to the present invention.

A lever 124 cooperates with cam 121, and this lever 124 is pivotally supported at its left end, as viewed in FIG. 13, by a pivot pin 125 fixedly carried by the left part 101 of the member 100, as viewed in FIG. 17. Adjacent its right free end, as viewed in FIG. 13, the lever 124 fixedly carries a pin 127 connected to one end of a spring 126 the other end of which is connected to shaft 112, so that the lever 124 is always urged by the spring 126 toward the axis of the cylindrical body 115.

The embodiment of FIGS. 13–17 operates as follows:

Assuming that the parts have the solid line position indicated in FIG. 13, it will be seen that in this position the trimming cutter 117 has just cut the spliced tape and the operator is about to release the guide arm 104 so that it will be returned by the spring 107 to its upper dot-dash line position indicated in FIG. 13. At this time the right free end of the lever 124 is located between the tip 122 of the cam 121 and the lower projection 123 thereof. It will be noted that at this time the tip 122 of the cam 121 is directed upwardly to the left, as viewed in FIG. 13.

When the operator releases the arm 104 so that it moves upwardly under the action of the spring 107, during the upward movement of the arm 104 the right end of the lever 124 pushes against the lower projection 123 of the cam 121 so as to turn the cam 121 together with the body 115 in a counterclockwise direction about the axis of the shaft 112, as viewed in FIG. 13, and thus the tip 122 of the cam will now be directed downwardly to the left, as indicated in the dot-dash line position of the parts shown in FIG. 13. This forceful turning of the cam and body 115 by the lever 124 during the upward movement of the arm 104 is sufficient to move the spring pressed pin 118 out of the recess 120 in which it was located when the parts were in the position indicated in solid lines in FIG. 13, and this movement of the body 115 continues until the pin 118 becomes located in the other recess 120, the parts being shown in this position in dot-dash lines at the upper portion of FIG. 13.

It will be noted that this counter-clockwise turning of the body 115 through approximately 90° from the lower to the upper position of FIG. 13 has resulted in turning of the trimming cutter 117 away from its operating position and the turning of the diagonal cutter 116 into its operating position.

When the guide arm 104 is again depressed by the operator, the spring 119 has sufficient strength to prevent turning of the cutter carrying body with respect to the arm 104 as a result of the action of the spring 126, and as a result during this downward turning of the arm 104 the tip 122 of the carrier 121 will simply ride over the right free end of the lever 124 which will now have its right free end located between the tip 122 and the upper projection 123, due to the fact that the tip 122 is at this time directed downwardly to the left. At the end of the downward movement of the arm 124 the cam and lever have the positions with respect to each other indicated in FIG. 14 where the diagonal cut 116 is shown at the end of its stroke.

Figure 15:
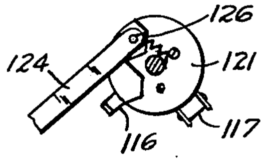
FIG. 15 shows the cutter carrying body of FIG. 14 in a still further angular position thereof.
Figure 14:
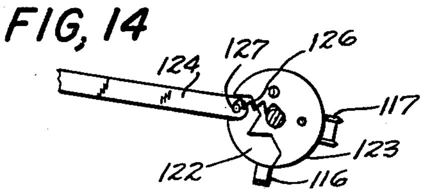
FIG. 14 shows a cutter carrying body of FIG. 13 in an angular position different from that of FIG. 13.

During the next upward movement of the arms 104 the right free end of the lever 124 will push against the upper projection 123 of the cam 121 so that at this time the cam 121 together with the body 115 are turned in a clockwise direction, as viewed in FIGS. 14 and 15 and therefore, at the end of the upward movement of the arm 104 the parts will have the position indicated in FIG. 15, which is the same position that the parts have at the lower part of FIG. 13 where the parts are shown in solid lines, except that the free end of the lever 124 is located above the tip 122 which is directed upwardly to the left at this time. During the next downward movement of the arm 104, so as to cut the tape with the trimming cutter 117, the cam 121 together with the body 115 will remain in the position indicated in FIG. 15, as a result of the cooperation of the spring pressed pin 118 with one of the recesses 120, and at this time the arm 124 will again ride over the tip 122 of the cam 121 so that at the end of the bottom stroke of the arm 104 the lever 124 will have the position with respect to the cam 121 which is indicated at the lower part of FIG. 13, and then during the subsequent upper movement of the arm 104 the above-described operations will be repeated.

Thus, during each of the upward movements of the arm 104 the cam together with the body 115 is turned in one direction or the other through approximately 90°, so that the direction of the lever guiding tip 122 is changed and so that the next cutter is located in the operating position, and during each downward movement of the arm 104 the tip of the cam 121 rides over the end of the lever 124 to locate the latter at the opposite side of the tip so as to turn the cam and body 115 in the opposite direction during the next upward movement of the arm 104. Thus, with this embodiment of the invention it is unnecessary for the operator to turn the cutter carrying body, this turning being brought about automatically, and the disc 114 need only carry indicia which indicates to the operator which of the cutters is in the operating position.

FIGS. 18–21 show another embodiment of the invention where the cutters are automatically moved into their operating positions. This embodiment of the invention also includes a base plate 25 having adjacent its rear end a pair of upstanding members 85 between which the roll of adhesive tape 58 is located on a shaft 86 which extends between and is carried by the members 85. Also, adjacent the front end of the base plate 25 is located the channel member 30 for receiving the tape portions which are to be spliced to each other.

A substantially U-shaped member 130 is fixed to the top face of the plate 25 and has a pair of upstanding end walls 131 formed with a pair of aligned bores through which the shaft 132 extends, the shaft 132 corresponding to the shaft 29 and the shaft 102 referred to above. At its outer ends the shaft 132 carries a pair of arms 31 identical with those described above and acted upon by leaf springs in the same way as described above, these arms being omitted from the drawings in the embodiment of FIGS. 19–21 for the sake of clarity.

Figure 18:
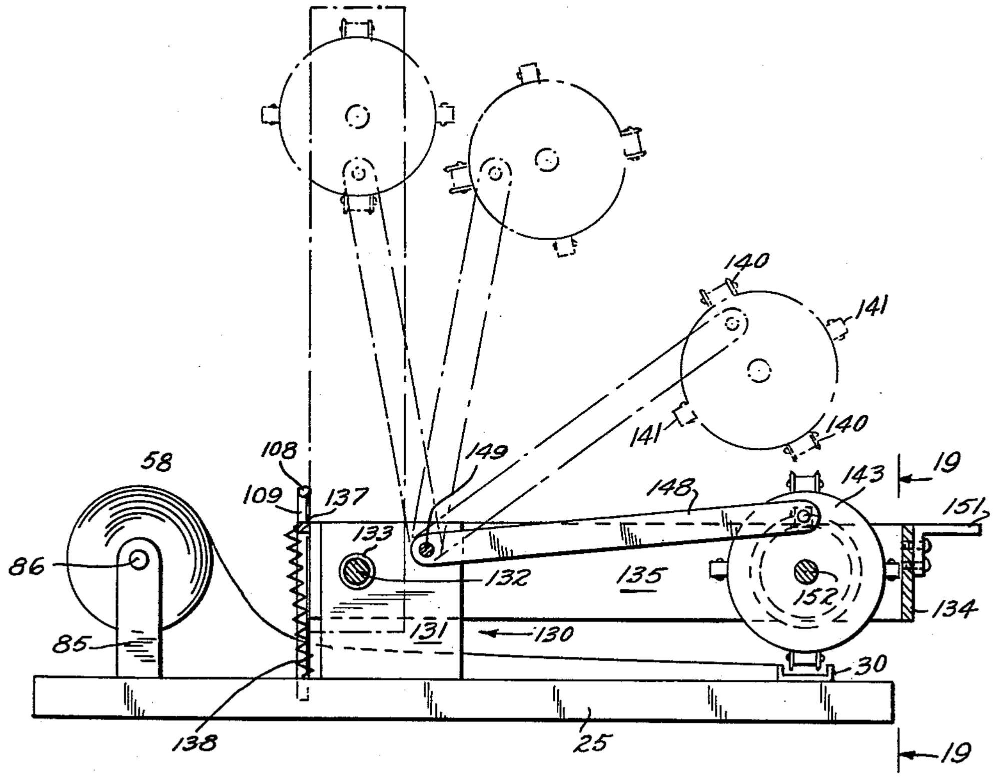
FIG. 18 is a longitudinal sectional elevational view of yet another embodiment of a splicer according to the present invention.
Figure 20:
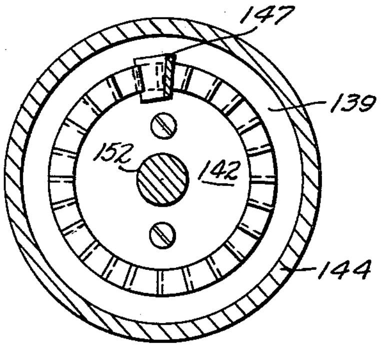
FIG. 20 is a sectional elevational view of part of the structure which automatically turns the cutter carrying body of FIG. 19, the section of FIG. 20 being taken along line 20—20 of FIG. 19 in the direction of the arrows.
Figure 21:
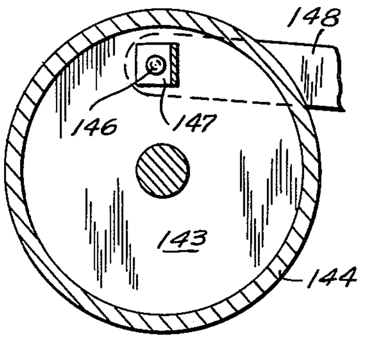
FIG. 21 is a sectional view of the structure of FIG. 19, the section of FIG. 21 being taken along line 21—21 of FIG. 19 in the direction of the arrows.

The shaft 132 fixedly carries next to the outer side surfaces of the upstanding members 121 a pair of collars 133 one of which is shown in FIG. 18, so as to prevent axial shifting of the shaft 132. The guide arm 134 of this embodiment of the invention is in the form of a substantially U-shaped member having a pair of rearwardly directed side walls 135 formed with aligned openings through which the shaft 132 extends, so that in this way the guide arm 134 is supported for turning movement by the shaft 132. The shaft 132 fixedly carries a pair of additional collars next to the outer surfaces of the side walls 135 to prevent axial shifting of the guide arm 134 on the shaft 132. A cross bar 137 is fixed to the rear ends of the walls 135 and extends between them. This cross bar is hooked onto one end of a spring 138 the opposite end of which is connected with base plate 25, so that this spring 138 urges the arm 134 upwardly from the solid line position indicated in FIG. 18 in a counterclockwise direction to a substantially vertical position where the top edge of the right wall 125, as viewed in FIG. 19, engages the stop portion 108 of the substantially L-shaped rod 109 shown in FIG. 19, this stop member being the same as that shown in FIG. 17 and described above.

A shaft 152 which is parallel to the shaft 132 extends through a pair of aligned openings formed in the walls 135 distant from the shaft 132, and this shaft 152 fixedly carries a pair of collars 136 engaging the outer surfaces of the walls 135, respectively, to prevent axial shifting of the shaft 152. This shaft 152 extends through an axial bore of a cylindrical cutter carrier body 139 which is fixed to the shaft 152 as by a set screw or the like, and this body 139 is located between the walls 135, as indicated in FIG. 19.

The body 139 carries a pair of diametrically opposed trimming cutters 140 and a pair of diametrically opposed diagonal cutters 141, these cutters alternating with each other and being angularly displaced by 90° from each other, as is evident particularly from FIG. 18.

Figure 19:
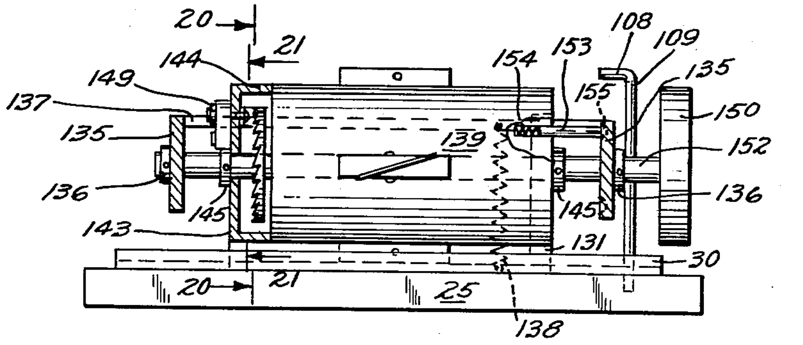
FIG. 19 is an end view of the structure of FIG. 18, the section of FIG. 19 being taken along line 19—19 of FIG. 18 in the direction of the arrows.

A ratchet wheel 142 is coaxially fixed to the left end face of the cylindrical body 139, as viewed in FIG. 19, by any suitable screw members or the like which are preferably countersunk, and a disc 143 is formed with a central bore through which the shaft 152 passes so that the disc 143 is freely turnable on the shaft 152, this disc 143 being located to the left of the ratchet wheel 142, as indicated in FIG. 19. The disc 143 has an annular flange 144 extending toward and engaging the left end face of the body 139, as viewed in FIG. 19 so that in this way the ratchet wheel 142 is housed within the enclosure formed by the disc 143 and its flange 144.

A pair of collars are fixed to the shaft 152 and respectively engage the right end face of the body 139 and the left face of the disc 143, as viewed in FIG. 19, so that in this way the body 139 cannot shift axially and the disc 143 together with its flange 144 are maintained in the axial position with respect to the body 139 which is illustrated in FIG. 19. A screw member 146 extends threadedly through a threaded bore of the disc 143 and has within the enclosure formed by elements 143 and 144 a head end which engages a pawl member 147 which may be in the form of a leaf spring, for example, so that in this way the pawl 147 is fixed to that surface of the disc 143 which is directed toward the cylinder 139. The free end of the pawl 147 cooperates with the teeth of the ratchet wheel 142, in the manner illustrated in FIG. 20.

The screw member 146 has a free end extending to the left outwardly beyond the disc 143, as viewed in FIG. 19, and a lever 148 is formed at its right end, as viewed in FIG. 18, with a bore through which the screw member 146 freely passes without being threadedly connected to the lever 148, so that the screw member 146 can turn freely in the bore of the lever 148, this screw member carrying at its left free end, as viewed in FIG. 19, a nut 149 which prevents the lever 148 from moving off from the screw member.

The opposite end of the lever 148 formed with a bore which receives a pivot pin 149 fixedly carried by the left wall 131, as viewed in FIG. 19, this wall being visible in FIG. 18, so that in this way the lever 148 is pivotally supported by the member 130 for turning movement about an axis which is parallel to and displaced from the shaft 132 which forms the pivot axis for the arm 134.

The arm 134 fixedly carries at its right end, as viewed in FIG. 18, a handle member 151 which facilitates the turning of the arm 134 by the operator. Also, the shaft 152 fixedly carries at its right free end, as viewed in FIG. 19, a disc 150 provided with indicia similar to that shown in FIG. 4, so that the operator can tell by glancing at the right surface of the disc 150, as viewed in FIG. 19, which of the cutters is in the operating position. The disc 150 serves only as an indicator and is not used for turning the body 139.

Also, a pin 153 shown in FIG. 19 is axially slidable in a bore of the body 139 and is pressed outwardly to the right by a spring 154 so as to enter one of four recesses 155 formed on the inner face of the right wall 135, as viewed in FIG. 19, these recesses 155 being angularly displaced from each other by 90° about the shaft 152 and located at the same radial distance therefrom as the pin 153. Thus, when any of the cutters 140, 141 are in their operating positions the pin 153 will be in one of the recesses 155.

The embodiment of FIGS. 18–21 operates as follows:

Assuming that the parts have the solid line position indicated in FIG. 18, where one of the trimming cuttters has just trimmed the spliced tape, the operator releases the handle 151 so that the spring 138 turns the arm 134 back up to the almost vertical dot-dash line position indicated in FIG. 18. During this upward turning of the arm 134, the lever 148 will turn the disc 143 with respect to the arm 134 in a counterclockwise direction through approximately 90° by the time the parts have reached their uppermost rest position, as is indicated in FIG. 18, and during this turning of the disc 143 the pawl 147 cooperates with the ratchet wheel 142 to turn the latter and the body 139 therewith, the spring pressed pin 153 moving out of one of the recesses 155 and into the next recess 155 by the time the parts have reached their rest position. In this way the next cutter is automatically brought into its operating position during the return of the arm 144 to its upper rest position.

During the subsequent downward turning movement of the arm 134, the lever 148 turns the disc 143 in a clockwise direction around the shaft 152 through approximately 90°, as is evident from FIG. 18, and at this time the pawl 147 simply rides over the teeth of the ratchet wheel 142, the body 139 and the ratchet wheel 142 being held with respect to the arm 134 so that they do not turn with respect to the arm 134 during the downward movement thereof, as a result of the cooperation between the pin 153 and one of the recesses 155, the force of the spring 154 being sufficient to hold the body 139 and the ratchet wheel 142 while the springy pawl 147 rides over the teeth of the ratchet wheel. In this way the cutter which has been placed in the operating position during the upward movement of the arm 134 remains in this operating position and cuts the tape, and during the next upward movement of the arm 134 the lever 148 again turns the disc 143 in a counterclockwise direction, as viewed in FIG. 18, so as to again turn the ratchet wheel 142 and the body 139, and of course during this turning movement the pawl 147 cooperates with the ratchet wheel to overcome the force of the spring 154 so as to turn the body 139 and locate the pin 153 in the next recess 155. In this way the successive cutters are automatically located in the operating positions with the embodiment of FIGS. 19–21.

It will be understood that each of the elements described above, or two or more together, may also find a useful application in other types of splicers differing from the types described above.

While the invention has been illustrated and described as embodied in automatic tape splicers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a device for splicing a tape or the like, in combination, a cutter carrying body carrying a plurality of cutters distributed about and located equidistantly from a first axis passing through said body so that said cutters are at given equal angular distances from each other; support means; manually operable guide arm means carried by said support means for swinging movement with respect thereto about a second axis and carrying said body for swinging the latter about said second axis through a given operating cycle to and from a cutting position where a selected one of said cutters, when the selected cutter is in an operating position, cuts a tape or the like when said body is in said cutting position, said guide arm means also cooperating with said body to support the latter for turning movement about said first axis to locate a selected cutter in said operating position; and means carried by said support means and operatively connected to said body for automatically turning the latter, during swinging of said body to and from said cutting position, about said first axis through said given angular distance automatically to locate said cutters successively in said operating position during successive cycles, respectively.

2. In a device for splicing tape or the like, in combination, support means; a manually turnable arm turnably carried by said support means; a cutter carrying body rotatably carried by said arm and carrying a plurality of cutters distributed about the turning axis of said body with respect to said arm so that during turning of said arm toward and away from said support means a selected cutter will cut a tape or the like on said support means when the selected cutter is in a given operating position; a cam actuating arm turnably connected to said support means for turning movement with respect thereto about an axis different from the turning axis of said arm which carries said cutter carrying body; and cam means fixed to said body and engaging said cam actuating arm to be automatically actuated thereby during turning of said first-mentioned arm with respect to said support means for successively locating the cutters in said operating position.

3. In a device for splicing tape or the like, in combination, support means; a manually turnable arm turnably carried by said support means; a cutter carrying body rotatably caried by said arm and carrying a plurality of cutters distributed about the turning axis of said body with respect to said arm so that during turning of said arm toward and away from said support means a selected cutter will cut a tape or the like on said support means when the selected cutter is in a given operating position; a cam actuating arm turnably connected to said support means for turning movement with respect thereto about an axis different from the turning axis of said arm which carries said cutter carrying body; and cam means fixed to said body and engaging said cam actuating arm to be automatically actuated thereby during turning of said first-mentioned arm with respect to said support means for successively locating the cutters in said operating position, said cam means cooperating with said cam actuating arm for turning said body back and forth through predetermined angles which locate first one and then another of said cutters in an operating position.

4. In a device for splicing tape or the like, in combination, support means; an arm turnably carried by said support means; a cutter carrying body turnably carried by said arm and carrying a pair of cutters; a lever turnably connected with said support means for turning movement with respect thereto about an axis different from the turning axis of said arm, said lever having a free end overlapping said body; and cam means fixed to said body and cooperating with said lever for automatically turning said body successively between angular positions which respectively locate said cutters successively in an operating position where said cutters cooperate with said support means to cut a tape or the like carried thereby when said arm is turned down toward said support means, said cam having a tip portion directed toward the free end of said lever and cooperating with said free end of said lever for directing said lever successively to different sides of said cam during successive turning movements of said arm toward said support means whereby said lever cooperates with said cam for turning said body first in one direction and then in the other direction during successive turning movements of said arm toward and away from said support means.

References Cited in the file of this patent

UNITED STATES PATENTS

| | | |
|---|---|---|
| 24,141 | Shattuck | May 24, 1859 |
| 24,165 | Thompson | May 24, 1859 |
| 81,707 | Tripp | Sept. 1, 1868 |
| 324,930 | Fletcher | Aug. 25, 1885 |
| 1,245,388 | Sandstrom | Nov. 6, 1917 |
| 1,375,721 | Nichols | Aug. 26, 1921 |
| 1,504,598 | Bergen | Aug. 12, 1924 |
| 1,704,962 | Bollaert | Mar. 12, 1929 |
| 1,781,000 | De Beaulieu | Nov. 11, 1930 |
| 2,607,421 | Anderson | Aug. 19, 1952 |
| 2,637,397 | Welk | May 5, 1953 |
| 2,764,240 | White et al. | Sept. 25, 1956 |
| 2,778,420 | Simon | Jan. 22, 1957 |